(12) United States Patent
Shear

(10) Patent No.: US 7,822,872 B2
(45) Date of Patent: Oct. 26, 2010

(54) MULTI-LOCATION DISTRIBUTED WORKPLACE NETWORK

(76) Inventor: Michael Shear, P.O. Box 16774, Golden, CO (US) 80401

( * ) Notice: Subject to any disclaimer, the term of this patent is extended or adjusted under 35 U.S.C. 154(b) by 1175 days.

(21) Appl. No.: 11/423,086

(22) Filed: Jun. 8, 2006

(65) Prior Publication Data

US 2007/0288663 A1  Dec. 13, 2007

(51) Int. Cl.
*G06F 15/16* (2006.01)
(52) U.S. Cl. .................. 709/238; 709/217; 709/224; 709/218; 709/242
(58) Field of Classification Search .................. 709/223, 709/224, 242, 217, 218, 238
See application file for complete search history.

(56) References Cited

U.S. PATENT DOCUMENTS

2001/0037384 A1* 11/2001 Jemes et al. .................. 709/223
2003/0046426 A1* 3/2003 Nguyen ......................... 709/224
2003/0074443 A1* 4/2003 Melaku et al. ................ 709/224
2004/0193695 A1* 9/2004 Salo et al. ..................... 709/216

* cited by examiner

*Primary Examiner*—Djenane M Bayard
(74) *Attorney, Agent, or Firm*—Townsend and Townsend and Crew LLP

(57) ABSTRACT

A network architecture and associated distributed workplace environment is described in accordance with various embodiments of the present invention. In one embodiment, a distributed workplace comprises a network of one or more office buildings in a greater metropolitan area. Each office building is divided up into distinct spaces for each of a group of employers or government agencies. Each selected employer and agency is networked via redundant and secure high speed connections to existing centralized locations. Employees in a distributed workplace office use voice, data and video services and work-sharing programs. A method of selecting an optimized physical location for the shared networked workplace is also described.

10 Claims, 7 Drawing Sheets under the present invention.

MULTI-LOCATION DISTRIBUTED WORKPLACE NETWORK

COPYRIGHT STATEMENT

A portion of the disclosure of this patent document may contain material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to network architecture in general and, in particular, to networks for a distributed workplace environment.

BACKGROUND OF THE INVENTION

The infrastructure needs of the United States have evolved rapidly over the past 60 years. Even as the nation embarked to build a comprehensive physical infrastructure of interstate highways to support the post war manufacturing economy, the transportation needs of America were evolving. With this initiative to build highways, the American worker had more choices of communities in which to live while being able to commute to centrally located workplaces (e.g., single-location workplaces) within a given radius.

However, this transportation infrastructure invited growth without a full understanding of the impact. Despite the fact that road construction and public transportation initiatives expanded rapidly, traffic issues in the United States continued to grow at a significant rate. The resulting sprawl and congestion require billions of gallons of gasoline per year. The major costs of these traffic issues include 1) greater reliance on gasoline, 2) greater expense of building and maintaining roads, 3) lost productivity of workers who spend increasingly more time in their cars and less at work, and 4) air pollution and air quality concerns. By some estimates, the lost productivity and wasted fuel due to these factors is over $100 million per day.

The growing impact of congestion in U.S. transportation models can serve to undermine the competitive posture of the U.S. worker and create an overall drag on the economy. Globalization is changing the landscape of the job market, as advances in technology and the opening of markets have resulted in the movement of certain jobs overseas.

However, information technologies and architectures that underlie today's internet and mobile communication services were spawned during this same period. These advances fostered a revolution in electronics and communications, and have allowed information to be processed and to flow with ever increasing speed and lower costs. Over the past several decades, there has been a decided shift in the U.S. labor force from manufacturing, where the tools of production are brought to one physical location, to a knowledge based workforce. While this information revolution has allowed certain jobs to flow overseas, there are significant opportunities to use this technology to solve challenges at home.

In fact, Federal and State laws and regulations have directed agencies to support increasing numbers of remote workers. But agencies have in many instances not been able to meet these requirements. There are many reasons behind this fact: difficulty of IT support, lack of critical broadband services, challenges with security issues, limited management oversight, and lack of social interaction. While technology companies have developed capabilities to support remote work, a comprehensive distributed architecture response to the congestion problem has not yet been implemented.

In addition to issues related to congestion, a single (or centralized) location model can present other problems. For example, in the event of a natural or manmade disaster, there are evacuation complexities and fewer network redundancies in a centralized model. There is, therefore, a need for additional telework alternatives to address congestion problems while providing employees and managers a range tools to improve productivity, quality of life, and continuity of operations (for the organization, and its network).

BRIEF SUMMARY OF THE INVENTION

A network architecture and associated distributed workplace environment is described in accordance with various embodiments of the present invention. In one embodiment, a distributed workplace comprises a network of one or more office buildings in a greater metropolitan area. Each office building is divided up into distinct spaces for each of a group of select employers or government agencies. Each selected employer and agency is networked via redundant and secure high speed connections to existing centralized locations and other distributed locations. Employees in a distributed workplace office use voice, data and video services and work-sharing programs to connect with their fellow workers as a remote workgroup virtually connected with one or more centralized locations.

In one exemplary embodiment, a system for securely providing network access at a shared facility is described. The system includes one or more private networks for each of a number of private or public organizations. The system further includes a workplace physically distinct from the private networks, and occupied by a subset of employees of each of the organizations. An additional private network is also described, comprising a number of redundant and secure communication links. The additional private network may comprise a set of network devices communicatively coupled to each other. The additional private network is configured to communicatively couple the workplace to the one or more private networks for each of the organizations (e.g., via network devices).

The additional private network, in one embodiment, includes a network operations center configured to manage the communication links between the workplace and each of the private networks. The network operations center is configured to monitor the communication links between the workplace and the private networks to identify links that do not meet specified performance or security thresholds, and reroute traffic or otherwise reconfigure the system accordingly.

In certain embodiments, the workplace includes distinct areas for exclusive use of the employees from each organization. There is also a distinct area comprising a server room configured to receive a data stream from each private network, and route the data streams to the applicable distinct areas. There may also be other common areas, including shared education areas. In one exemplary embodiment, each private network and the workplace are located, at least in part, in a single metropolitan area. However, in other embodiments there may be any number of distributed shared workplace environments. In addition, there may be one or more local or remote network operations centers.

In another set of embodiments, a method of selecting an optimized physical location for a networked workplace shared by a number of distinct organizations is described. The locations of the residences of employees of the plurality of organizations are identified, and the commuting patterns for the employees are analyzed. Network traffic congestion and flow statistics for regional data networks in the region are analyzed. Network traffic attributable to each of at least a subset of the employees is measured. Based at least in part on the identified residence locations, the commuting patterns, the analyzed network traffic congestion and flow statistics, and the network traffic attributable to each of the employees, an optimized physical location for the networked workplace is selected. Cost factors associated with connecting the shared networked workplace to selected data networks may be analyzed as well, and factored into the selection. Different weights may be applied to the various factors.

In one embodiment, a shared networked workplace is established at the location, with secure and redundant communication links to the plurality of distinct organizations. In another embodiment, a location of one or more existing network operations centers is identified, each configured to manage the connectivity between the shared networked workplace and each of the plurality of distinct organizations. The location of the network operations centers is factored into the selection as well. Additional optimized physical locations for additional networked workplaces, along with an optimized location for a network operations center, may be selected based on the factors listed above.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
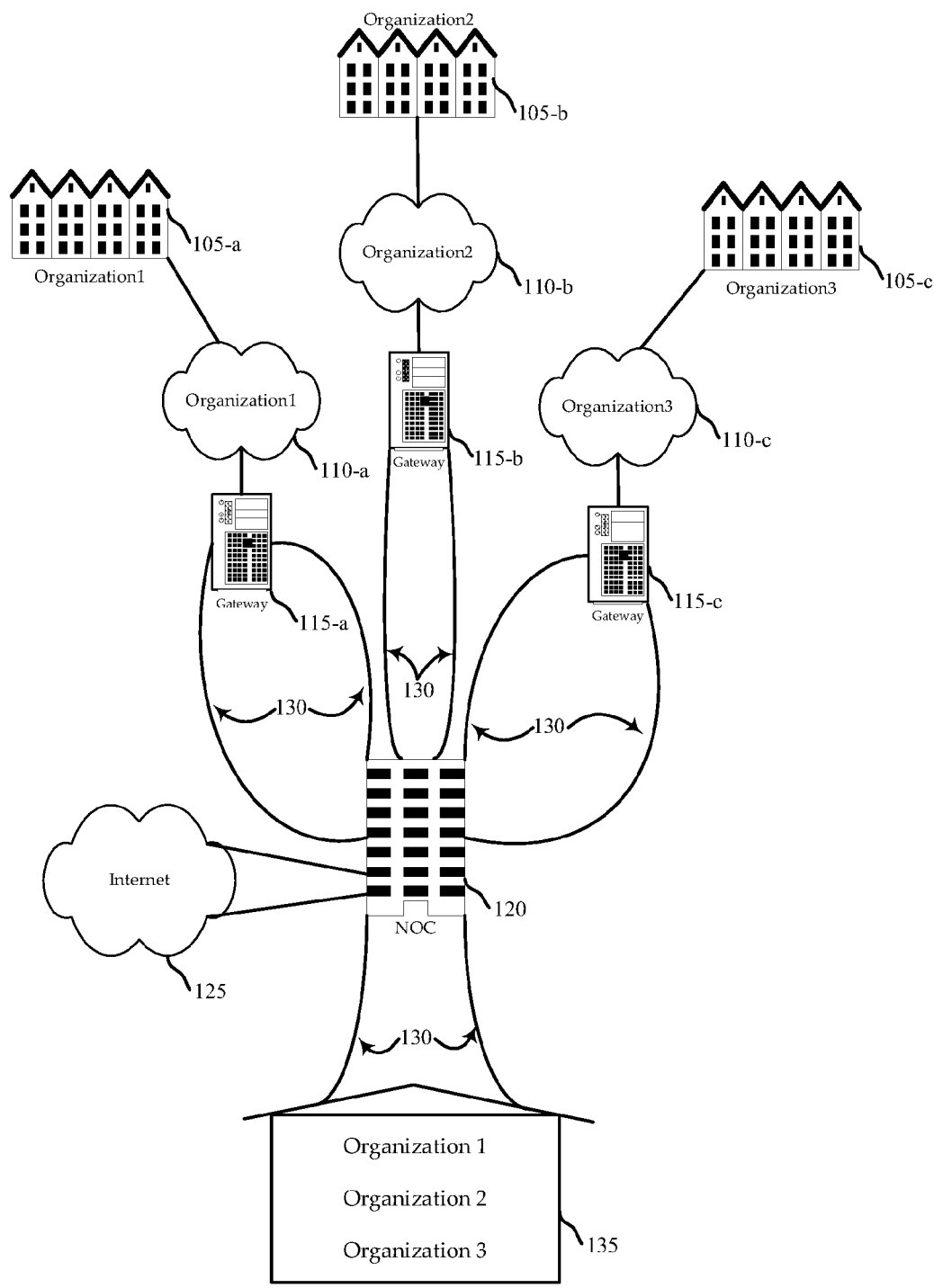
FIG. 1 is a simplified block diagram illustrating a network architecture for a shared workplace environment and network operations center according to various embodiments of the present invention.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following embodiments.

Systems are described comprising a network architecture for a shared, distributed workplace environment. In one embodiment, the distributed workplace network comprises one or more office buildings in a greater metropolitan area. Each office building is divided up into distinct spaces for each of a group of select employers, government agencies, or combination thereof. Each selected employer and agency is networked via redundant and secure connections from their respective centralized locations to the distributed workplace environments. Employees in the distributed workplace office use voice, data and video services and work-sharing programs to connect with their fellow workers at multiple locations as a remote workgroup.

The distributed workplace described herein differs from work from home and existing telework centers. Work from home efforts are often difficult to scale because each employee is geographically separated, which may make IT support and worker coordination difficult. Telework centers may be a step in the right direction, but often are configured without exclusive areas for different organizations, or without a coordinated network architecture which provides resilience and security for these organizations. Without modification, such efforts are unlikely to adequately address the key challenges set forth in detail above. For the most part, neither the work from home or existing telework centers have become the primary work location of remote workers.

In a typical implementation of a distributed workplace infrastructure, there may be four to six office buildings in a metropolitan area, although alternative implementations may include a significantly greater number. These buildings might be distributed throughout a metropolitan region, closer to the residential locations of certain employees than the centralized or primary locations of the employers. This implementation might support between 300 to 1,500 employees from several of the larger employers (e.g., private corporations and federal/state government agencies) in a geographic area. Each agency or company may have a dedicated, secure centralized office network, which through the architecture discussed herein is extended to the shared, geographically distributed workplace facilities. A high-speed network, supporting enhanced collaborative and interactive systems creating a virtual presence work environment, may permit geographically separated employees to work productively from such locations. This distributed workplace configuration integrates solutions to issues of geography and technology by using secure and scalable architectures.

In a typical distributed workplace building, there may be a number of distinct areas for the exclusive use of resident employees of each participating organization. Merely by way of example, a typical building might have seven to twelve "telesuites," each comprising a distinct exclusive use area. A typical distinct area might be configured with space for 25-50 employees. There may also be one or more common areas, education facilities, IT/server rooms, and other facilities. One or more call centers, perhaps associated with one of the organizations, may be included as well.

The network architecture for a typical distributed workplace building would provide redundant and secure network connectivity between a primary, or otherwise centralized, organization and their telesuites at several or all the distributed workplace locations. Enterprise services for each organization may therefore be extended from centralized locations to a server room in the distributed workplace, and on to each telesuite. The network architecture is configured to be resilient and redundant, so as to reliably provide these services. Access controls, authentication, and data encryption may be components of security.

One or more network operations centers manage connectivity and service administration for each organization in a city or metropolitan area installation. While the network operations center may be located in the metropolitan area, it may be remote as well. Services for each client may be engineered for each client's requirements. Intranets, containing business critical data applications, voice integrations from the public switched telephone network ("PSTN") and other circuit switched networks to packet switched voice over internet protocol ("VoIP"), and video and other multimedia services, may be extended from a client site. The network operations center may, for example, route these services through IP tunnels to workstations via a secure virtual local area network ("VLAN").

While exemplary numbers and configurations are attributed to the network architecture and workplace design of the distributed workplace described above, these examples should not be interpreted to limit the different configurations. The following description adds additional exemplary embodiments which should not be taken as limiting the scope of the invention, which instead is defined in the claims.

Turning to FIG. 1, an exemplary network architecture 100 for a shared workplace environment and network operations center is illustrated. In this embodiment, the centralized locations (e.g., corporate campus, headquarters, etc.) of three different organizations 105-a, 105-b, and 105-c, are shown. An organization may, for example, comprise a local, state, or government entity, any other public organization, a private company, a corporation, or another nonprofit entity. In this embodiment, there are three different organizations, while in other embodiments, there may be more, or fewer, organizations.

Each centralized location 105-a, 105-b, and 105-c is communicatively coupled with its own private network 110-a, 110-b, and 110-c serving the organization. As used herein, the term private network comprises a group of two or more network devices that use private network address space for addressing purposes, the configuration privately controlled by a selected one or more organizations. One example of such address space is the private IP address space described in RFC 1918. Alternatively, the private network may comprise a network using the link-local address range described in RFCs 3330 and 3927. A private network may also comprise a virtual private network (VPN), in which links utilize tunneling, security controls, and end-point address translation, giving an end user a view that a dedicated line exists between nodes. An example of VPN is a network configuration described in RFC 4265. A network device may comprise any router, switch, server, computer, workstation, web servers, or other computing devices, either fixed or mobile, configured to transmit and receive data from other computing devices.

If a network device on a private network wants to communicate with outside networks, it may use a gateway (e.g., a network address translation (NAT) device or proxy server) to ensure that the outside network is presented with an address that is publicly-reachable. Thus, in this embodiment, each private network 110-a, 110-b, and 110-c is respectively coupled with a gateway 115-a, 115-b, and 115-c. A gateway 115 may be integrated into a network device of the respective private network 110, or it may comprise a stand alone unit.

The gateway devices 115 in this embodiment are each communicatively coupled with a network operations center 120 via secure and redundant communication links 130. As used herein, the term secure link comprises a link between two or more network devices configured to encrypt data via a cryptographic protocol (e.g., providing endpoint authentication and communications privacy), such as the Secure Sockets Layer (SSL) or Transport Layer Security (TLS) protocols.

As used herein, the term redundant link is a link comprising physically distinct, alternative communications paths between two or more network devices. Between two devices, for a communication link to be considered redundant, there is an alternate path of communication between devices if any link between them is cut, or otherwise fails. Communication links, as that term is used herein, comprise any wired (e.g., PSTN, Ethernet), wireless (e.g., cellular, satellite, fixed wireless, WiMax), optical (e.g., fiber optic cable, free space optics), power line, or other communications medium. A network device, such as a router or switch, may use spanning tree protocol and similar techniques to recover from failed links.

The network operations center 120 is, in this embodiment, configured to manage the communication links between the distributed shared workplace 135 and the gateways 115 routed through the network operations center 120. Thus, there are secure and redundant links 220 between the central private network 210 and the shared workplace 215, as well. However, in another embodiment, the network operations center 120 controls a private network to manage other links between the gateways 115 and the workplace 135 (that are not necessarily routed through the network operations center 120).

In either embodiment, the network operations center 120 is configured to monitor the communication links between the workplace 135 and the private networks 110 to identify links that do not meet specified performance or security thresholds, and reroute traffic or otherwise reconfigure the system accordingly. For example, the network operations center may monitor data traffic rates and other flow metrics over different links, and from different network devices. These metrics may include connectivity, one-way and round-trip delay and loss, delay variation, loss patterns, jitter, other packet reordering, bandwidth capacity and utilization, and quality of service. Also, the network operations center may implement, monitor and analyze security measures and metrics of the of the links and network devices. These may include authentication and encryption procedures, intrusion detection data, protocol analysis, access control features, and vulnerability analysis, along with virus, malware, spyware, and spam monitoring and prevention. There is a variety of hardware, and software, known in the art that can perform such monitoring to determine when links are vulnerable, underperform, or fail. Such technology may also implement proactive and reactive patches.

In this embodiment, the shared workplace 135 includes, for each organization, a distinct area for the exclusive use of their employees, which may be referred to hereinafter as a telesuite. In other embodiments, there is also a distinct area comprising a server room configured to receive a data stream from each private network 110, and route the data streams to the applicable distinct areas. There may also be other common areas (e.g., meeting rooms, education facilities, etc.). In this embodiment, each private network and the workplace are located, at least in part, in a single metropolitan area. However, in other embodiments, there may be more than one local, or remote, network operations centers serving the area. There may also be any number of additional office buildings (or sub-areas thereof) for other shared workplace environments, each monitored by one or more network operations centers 120.

In one embodiment, the shared workplace 135 (i.e., the network devices therein) may communicate with the Internet 125 only via links routed through the network operations center 120, and in that case the network operations center 120 serves as the gateway for the workplace 135. However, in other embodiments, the shared workplace may otherwise be connected to the Internet 125.

Figure 2:
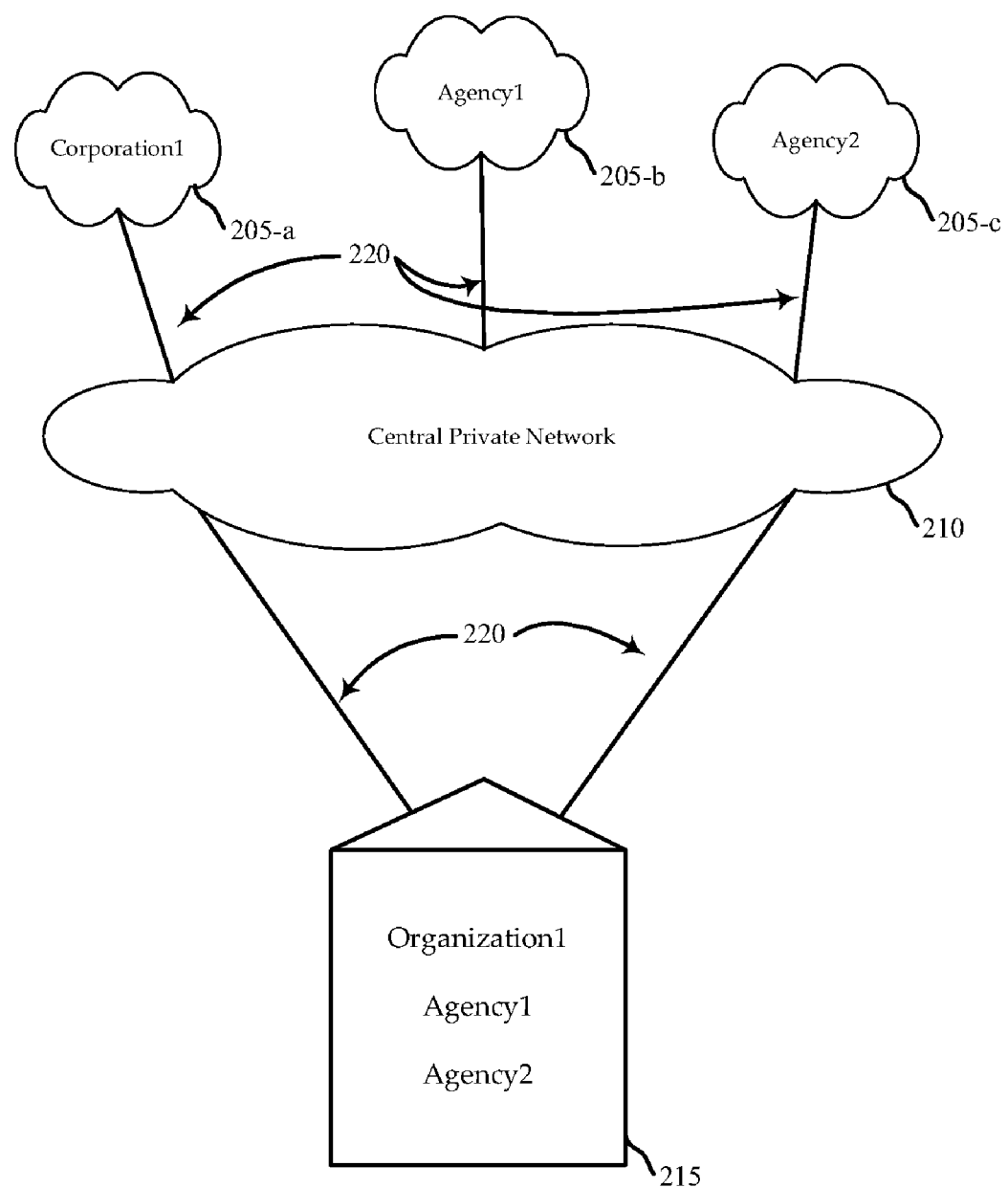
FIG. 2 is a simplified block diagram illustrating a set of connected networks and an associated shared workplace according to various embodiments of the present invention.

FIG. 2 shows another embodiment of the invention, illustrating an exemplary network configuration 200 comprising a set of connected networks 205, 210 and an associated shared workplace 215. This embodiment includes a number of distinct private networks: a private network of Corporation1 205-*a*, a private network of Agency1 205-*b*, and a private network of Agency2 205-*c*. Each of these private networks 205 is individually coupled with a fourth, "central" private network 210, via distinct communication links 220. The central private network 210 is communicatively coupled with a shared workplace 215 via secure and redundant communication links 220. The shared workplace 215 includes, for each entity (Corporation1, Agency1, and Agency2), a telesuite for the exclusive use of their employees. The data streams to and from each private network 205-*a*, 205-*b*, and 205-*c* are routed through private network 210, to the respective telesuite of the applicable entity. In some embodiments, the central private network 210 includes a network operations center to monitor the links of the central private network 210, and configure the communication paths between the other private networks 205, and the shared workplace 215.

Figure 3:
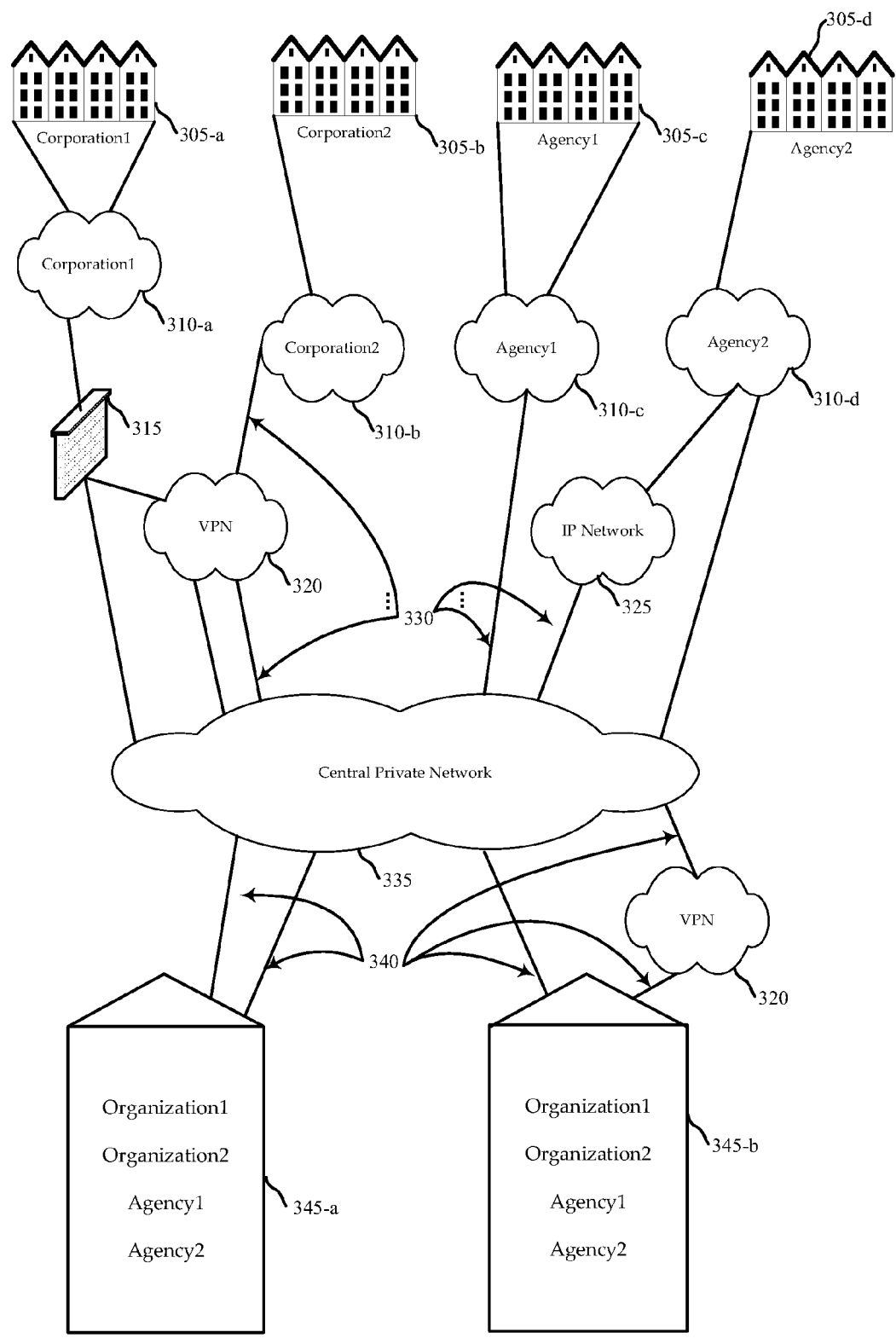
FIG. 3 is a block diagram illustrating a network architecture comprising a connected set of private networks and shared workplaces according to various embodiments of the present invention.

FIG. 3 sets forth yet another exemplary network architecture 300 comprising a connected set of private networks and shared workplaces. In this embodiment, the centralized locations (e.g., corporate campus, headquarters, etc.) of four different organizations 305-*a*, 305-*b*, 305-*c* and 305-*d*, are shown. They comprise Corporation1 305-*a*, Corporation2 305-*b*, Agency1 305-*c*, and Agency2 305-*d*. This embodiment includes a distinct private network 310 of each entity, communicatively coupled with the respective entity: a private network of Corporation1 310-*a*, a private network of Corporation2 310-*b*, a private network of Agency1 310-*c*, and a private network of Agency2 310-*d*. Each of these private networks 310 is individually coupled (directly, or indirectly) with a central private network 335, via distinct communication links 330 (only a subset of which are identified with reference numerals).

There area a variety of ways in which the communication links may be configured to connect the private networks 310 with the central private network 335. By way of example, the private network of Corporation1 310-*a* is coupled with a gateway 315 configured with a firewall. The gateway 315 is communicatively coupled with the central private network 335 directly, and also via a VPN 320 connection (perhaps over the Internet). The VPN 320, in this embodiment, is connected with the central private network 335 via redundant communication links. Compare the private network of Corporation2 310-*b*, which is only coupled with the central private network 335 via the VPN 320, and has no direct connection. The private network of Agency1 310-*c* is different still, as it is only coupled with the central private network 335 directly. And compare the private network of Agency2 310-*d*, which is directly coupled with the central private network 335, and via an alternative path over an IP network. Numerous other configurations are possible, but the foregoing examples illustrate a number of the possible options. In various embodiments, each of the private networks 310 may be coupled with the central private network in the same, or different, fashions.

The central private network 335 comprises a set of network devices communicatively coupled to each other with redundant and secure communication links. Moreover, the central private network 335 in this embodiment is configured with secure and redundant links 340 to each of two different shared workplace locations 345-*a*, 345-*b*. Each shared workplace 345 includes, for each entity (Corporation1, Corporation2, Agency1, and Agency2), a telesuite for the exclusive use of their employees. The central private network 335 is configured to receive (or transmit) data from (or to) the private networks of each organization 310, and route the data through an optimized path through the central private network 335, to the shared workplace. This configuration allows the central private network 335 to link, via any number of methods known in the art, the private networks of each organization 310 to their respective telesuites at each shared workplace 345-*a*, 345-*b*.

Figure 4:
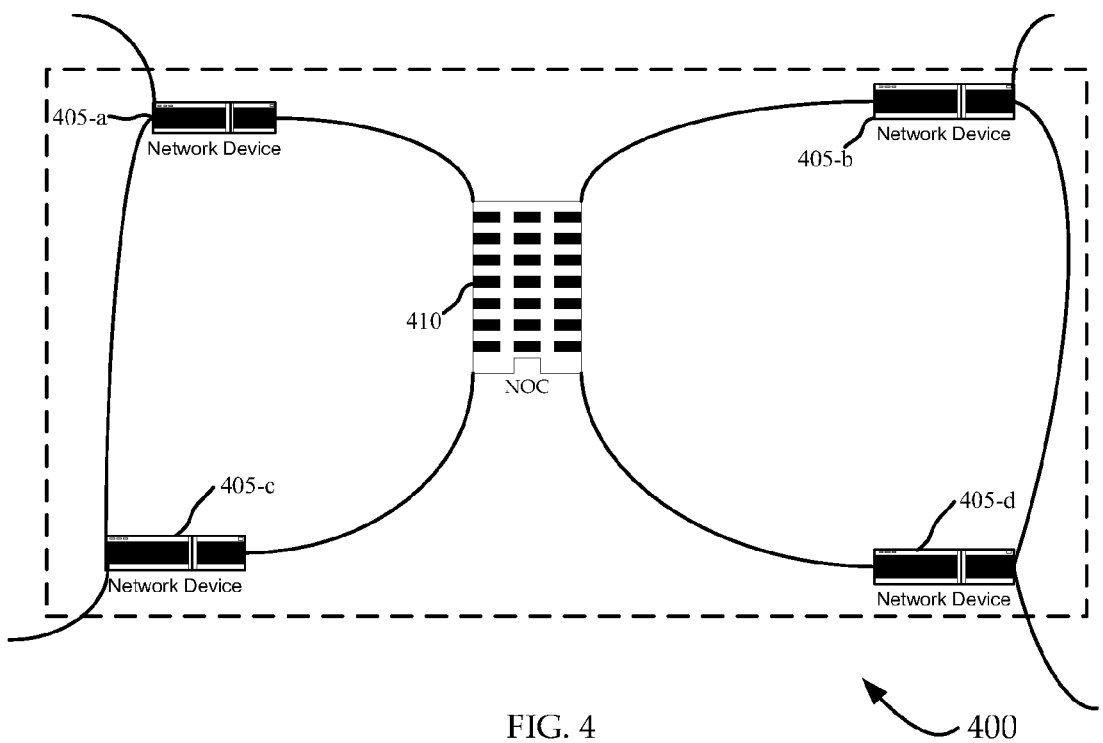
FIG. 4 is a simplified block diagram illustrating an exemplary private network including secure and redundant connections and a network operations center configured according to various embodiments of the present invention.

In order to provide improved security and resiliency, the central private network 335 may include a network operations center configured to manage the communication links and control data traffic paths between each distributed shared workplace 345 and the gateways/private networks of each organization 310. An example of such a configuration is illustrated in FIG. 4, wherein one embodiment of a central private network 400 is shown (the boundaries of which are identified by a dashed line).

The central private network 400 in this embodiment includes a network operations center 410 to manage the communication links and control data traffic paths. By way of example, it may be configured to monitor different bandwidth and performance requirements for each organization by their service model. This management may be extended from a shared workplace to a gateway for the organization's private network, so that consistent connectivity, performance and protection may be accounted for in meeting the traffic and application demands for that organization. Network and Element Management Systems ("NMS" and "EMS") at the network operations center 410 may monitor the links and network devices of each organization and location. Databases and trend analysis applications may track history of links and report performance and potential problem trends, so that modified services or fault isolation may be provided. Reports may be produced to track performance against Service Level Agreements (SLAs) and security configurations. The network operations center 410 may comprise one, or more, network devices. Numerous other configurations are possible with the scope of this invention, as evident to one skilled in the art.

In addition to the network operations center 410, the central private network 400 includes a number of additional network devices (405-a, 405-b, 405-c, 405-d). It is worth noting how the redundant configuration in this embodiment provides additional reliability. If any given link fails between network devices 405, or between a network device 405 and the network operations center 410, there remains an alternate route between nodes 405, 410.

Figure 5:
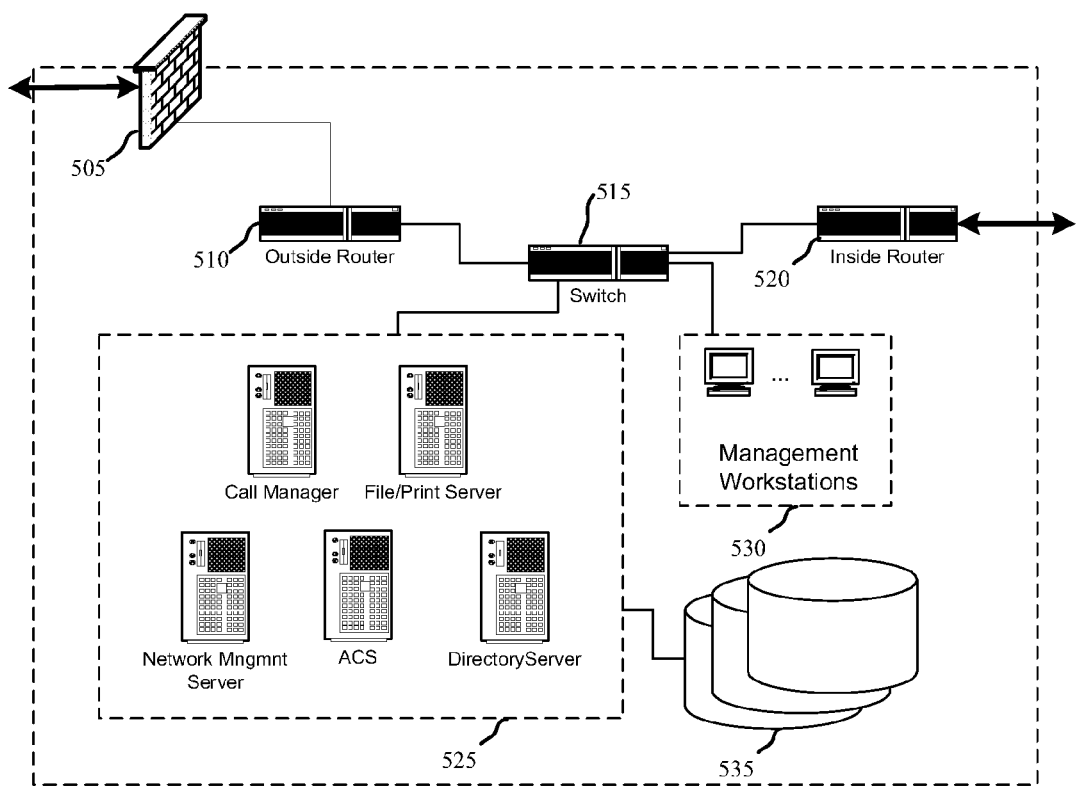
FIG. 5 is a block diagram illustrating a network operations center configured according to various embodiments of the present invention.

Turning to FIG. 5, an example of the configuration 500 of the network operations center is illustrated (the boundaries of which are identified by a dashed line). In one embodiment, the components of the network operation center are located in a single facility, but in other embodiments they may be dispersed geographically. From a private network of an organization and from the Internet, data traffic is received through a firewall 505. A firewall 505 has the basic task of controlling traffic based on a security policy, between these different zones of trust. This firewall is configured to act as a gateway (e.g., providing NAT/proxy server functionality) to control connectivity between zones of differing trust levels. An outside router 510 receives and transmits traffic to and from the Internet and the private networks of participating organizations. An inside router 520 interfaces with the shared workplaces, which in this embodiment are connected to the network operations center via a number of connections. Through the inside router 520, private link connectivity, or VPN tunneling, may be provided to any number of organizations.

A switch 515 connects various components, including various servers 525 (e.g., Call Manager, File/Print Server, Network Management Server, Access Control Server, and Directory Server) configured to carry out the functions to be performed by the network operations center. In this embodiment, the network operations center is thereby configured to manage the connectivity and service administration for each organization in a metropolitan area installation. The servers 525 are configured to map data traffic to, and from, a private network of an organization to the appropriate telesuite of the organization at a shared workplace. Data related to the network monitoring, service level requirements, network configuration, etc. may be stored in one or more databases 535. Integration of services may be individually tailored for each organization's requirements. For example, various embodiments may include QoS, flow controls, prioritization, expedited forwarding, and inbound and outbound rate limiting. The network operations center may be controlled via a number of management workstations 530, located at the operations center or remotely.

Figure 6:
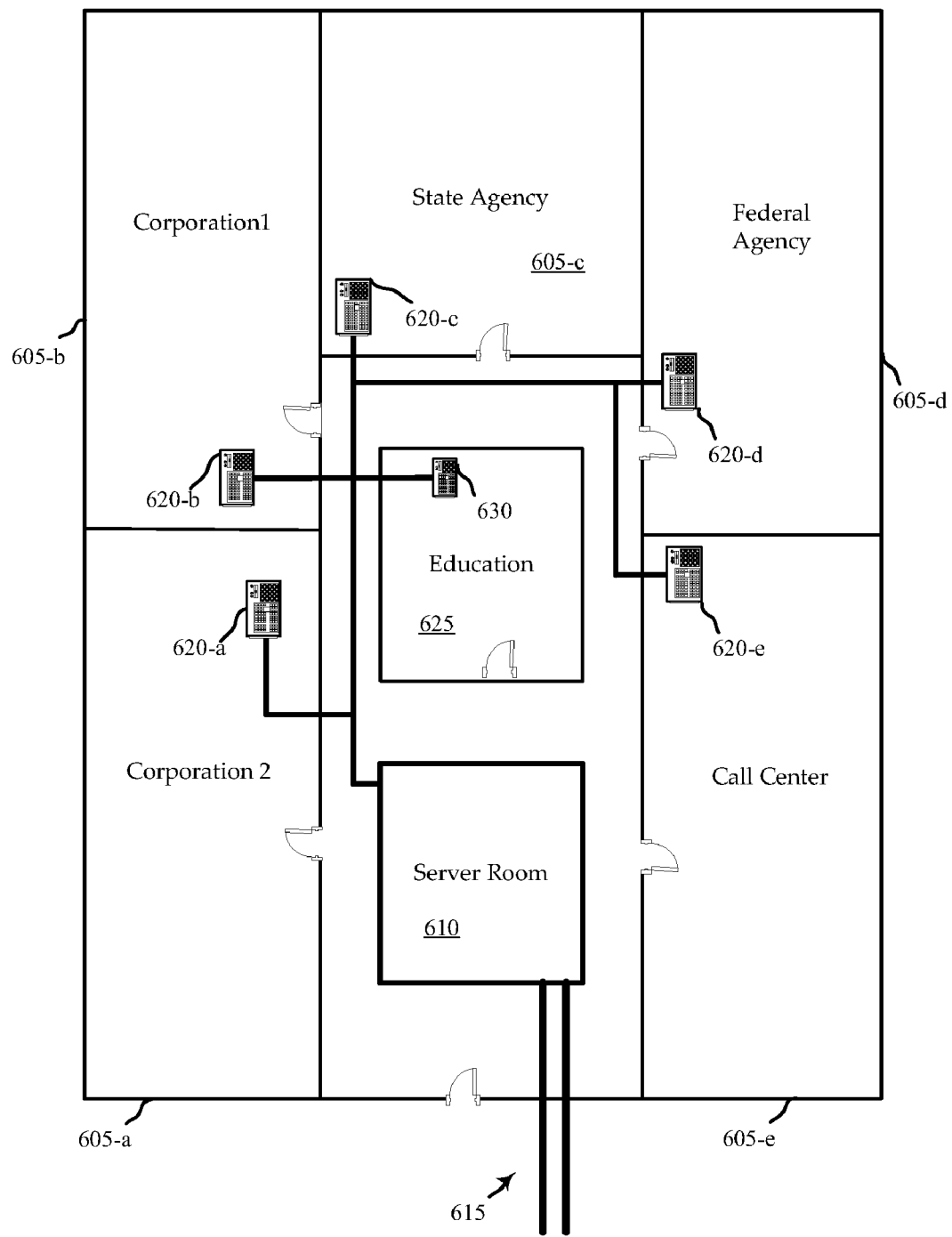
FIG. 6 is a block diagram illustrating an exemplary shared workplace environment according to various embodiments of the present invention.

FIG. 6 illustrates an exemplary configuration of a shared workplace 600 designed according to various embodiments of the invention. In this instance, it is worth emphasizing that the configuration is but one of a wide variety of alternative configurations available. In this embodiment, the workplace includes distinct areas (605-a, 605-b, 605-c, 605-d, 605-e) for exclusive use of the employees from each organization (Corporation2, Corporation1, State Agency, Federal Agency, Call Center).

Workstations within each telesuite may be configured with wired, or wireless, services (e.g., Gigabit Ethernet Cat6 hard-wired, or wireless IEEE 802.11x services). The platform may be configured to support various operating systems and applications through a combination of integration tools and web-based solutions. There may, for example, be PBX enhanced functions, voicemail, and unified messaging. VoIP solutions may extend personal office numbers, call follow-me, and voice messaging. Video conferencing, for one-on-one and group meetings, may be provided and compliment the interaction of geographically separated workgroups to establish a virtual presence environment, providing interactive video integration. Electronic whiteboard may be available, as well, and may be configured to allow for a more free form and spontaneous exchange of ideas and information resulting in recorded materials for dissemination and later review.

There is also a distinct area comprising a server room 610 configured to receive a data stream 615 (via redundant paths) from each private network, and route the data streams to servers 620 for the applicable distinct areas. In this embodiment, each distinct area has an individual server to receive and transmit data. However, in other embodiments, a single server might route the information to each workstation individually. There are also other common areas, including a shared education area 625 (with its own server 630). This shared education facility 625 may serve the employees in residence, or others. In this embodiment, the workplace 600 and each served private network are located, at least in part, in a single metropolitan area.

Figure 7:
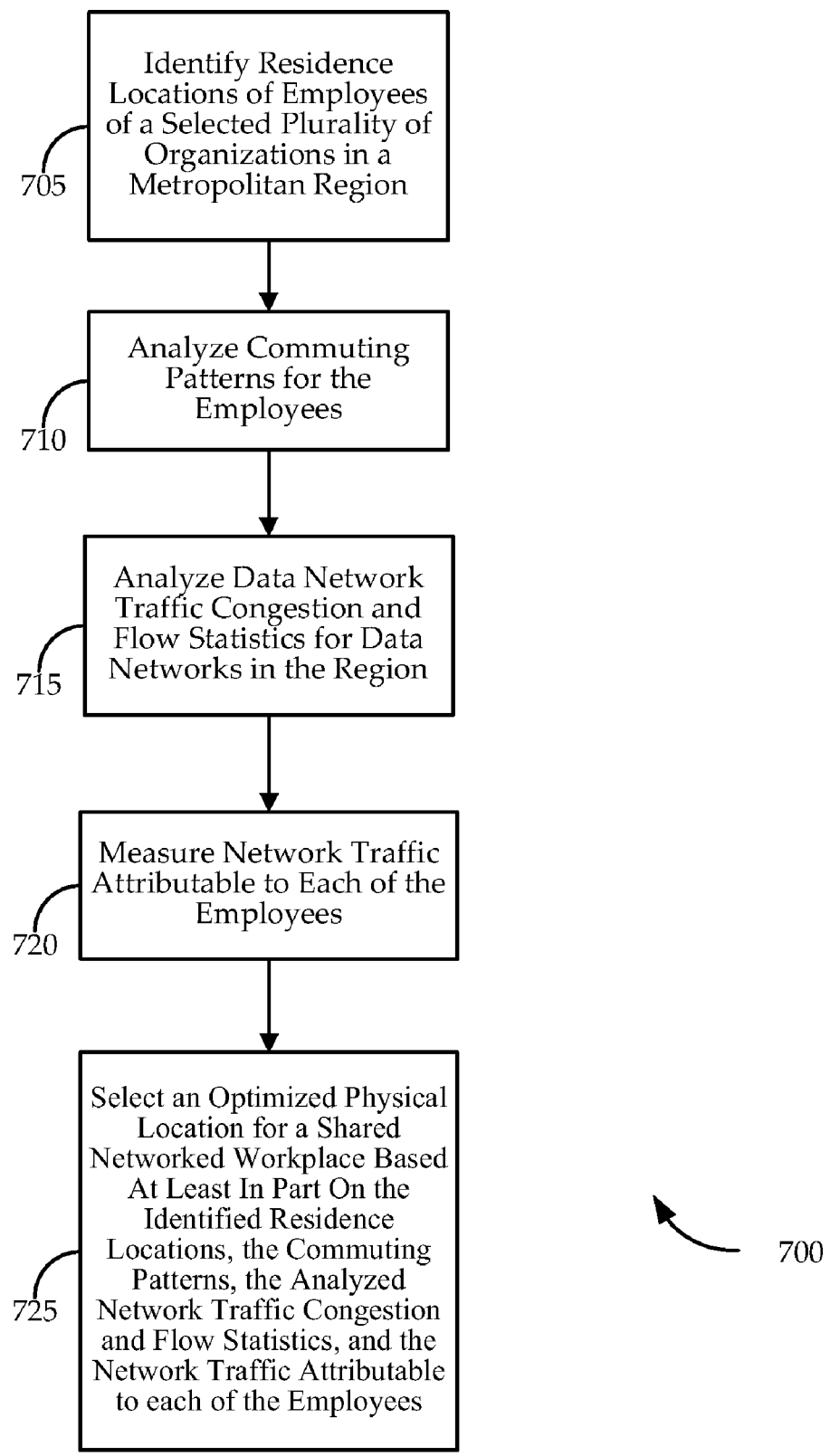
FIG. 7 is a flow diagram illustrating a method of selecting an optimized physical location for a networked workplace shared by a number of distinct organizations according to various embodiments of the present invention.

Turning to a FIG. 7, a flow chart is shown illustrating a method 700 of selecting an optimized physical location for a networked workplace shared by a number of distinct organizations. At block 705, the locations of the residences of employees of the plurality of organizations are identified. The area may be limited to certain sub-regions of a metropolitan area. The identified employees of an organization may be limited to employees performing certain functions, or part of certain groups. Regardless, once employees (and their residence locations) are identified, their transportation commuting patterns and actual and projected congestion patterns are analyzed at block 710. The time, duration, path, and regularity of their commute may be accounted for in the analysis.

At block 715, projected and actual network traffic flow statistics for data networks in the region (or subregion) are analyzed. This analysis may focus on the utilization rate, architecture, possible access points, and expansion possibilities. Choke points may be identified, as well. At block 720, network traffic attributable to each of at least a subset of the employees is measured. At block 725, and based at least in part on the identified residence locations, the commuting and traffic congestion patterns, the analyzed network traffic flow statistics, and the network traffic attributable to each of the employees, an optimized physical location for the networked workplace is selected. The various physical location options may be limited (before or after a selection is made) to available locations only. Instead of identifying one location only, the selection may comprise a number of ranked location options.

This method may be implemented with a computer program embodied on a computer readable medium, comprising instructions executable by a processor. Cost factors associated with connecting the shared networked workplace to selected data networks may be analyzed as well, and factored into the selection. Different weights may be applied to the various factors. For example, if the price of data transmission drops and gasoline prices continue to rise, the locations of the residences may be of more importance (i.e., weighted more heavily).

In one embodiment, a shared networked workplace is established at the selected location, with secure and redundant communication links to the plurality of distinct organizations. In another embodiment, a location of one or more existing network operations centers is identified, each configured to manage the connectivity between the shared networked workplace and each of the plurality of distinct organizations. The network operation center may also manage the administration of services (i.e. moves, adds and changes; assignment of personnel; policy and security levels for access; and utilization tracking). In such embodiments, the location of the network operations centers is factored into the selection as well. Additional optimized physical locations for additional networked workplaces, along with an optimized location for a network operations center, may be selected based on the factors listed above.

Figure 8:
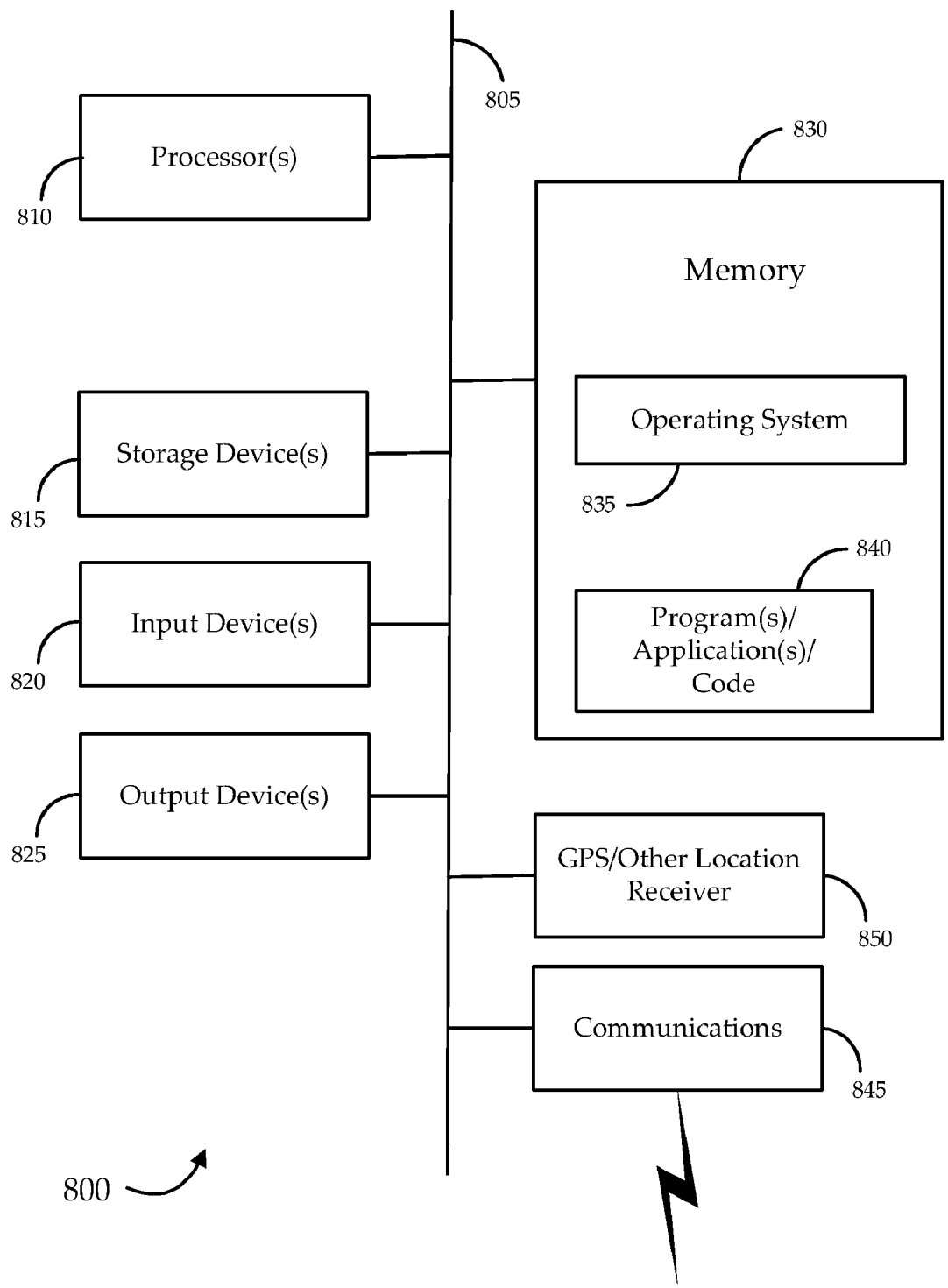
FIG. 8 is a schematic diagram that illustrates a representative device structure that may be used in various embodiments of the present invention.

A device structure 800 that may be used for a network device, computer, server, router, switch, or other computing device described herein is illustrated with the schematic diagram of FIG. 8. This drawing broadly illustrates how individual system elements of each of the aforementioned devices may be implemented, whether in a separated or more integrated manner. The exemplary structure is shown comprised of hardware elements that are electrically coupled via bus 805, including processor(s) 810 (which may further comprise a DSP or special-purpose processor), storage device(s) 815, input device(s) 820, and output device(s) 825. The storage device(s) 815 may comprise a computer-readable storage media reader connected to any computer-readable storage medium, the combination comprehensively representing remote, local, fixed, or removable storage devices or storage media for temporarily or more permanently containing computer-readable information. The communication interface(s) 845 may comprise a wired, wireless, or other type of interfacing connection or antenna that permits data to be exchanged with other devices. The communication interface 845 may permit data to be exchanged with a network.

The structure 800 may also comprise additional software elements, shown as being currently located within working memory 830, including an operating system 835 and other code 840, such as programs or applications designed to implement methods of the invention. The structure may include a GPS or other Location Receiver 850, to receive and provide location based data. This functionality may be configured to be used in this architecture for deployment for first responders and other emergency services. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other computer readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A system for securely providing network access in a shared workplace environment, the system comprising:
    a first private network of a first organization;
    a second private network of a second organization;
    a workplace physically distinct from the first private network and the second private network, the workplace comprising:
        a first distinct area occupied by and for exclusive use of a subset of employees of the first organization;
        a second distinct area occupied by and for exclusive use of a subset of employees of the second organization;
        a third distinct area comprising a common area; and
        a fourth distinct area comprising a server room including at least a portion of a network operations center;
    a third private network comprising a plurality of network devices, the third private network configured with redundant and secure communication links between each of the plurality of network devices, wherein the third private network is configured to:
        communicatively couple the first private network and the workplace using a first subset of the plurality of network devices; and
        communicatively couple the second private network and the workplace using a second subset of the plurality of network devices,
    wherein one or more network devices of the third private network comprises at least a portion of the network operations center, the network operations center comprising an outside router and an inside router in communication with each other, the network operations center configured to:
- manage the communication links between the workplace and the first private network, and the communication links between the workplace and the second private network;
- monitor bandwidth and performance specification for the first organization and the second organization;
- receive, via the outside router, a first data stream from the first private network and a second data stream from the second private network;
- route, via the inside router, the first data stream to only a first distinct area of the workplace occupied by and for exclusive use of a subset of employees of the first organization; and
- route, via the inside router, the second data stream to only the second distinct area.

2. The system of claim 1, wherein the network operations center is configured to: monitor the communication links between the workplace and the first and second private networks to identify a link that does not meet a specified performance threshold; reroute traffic destined for the identified link over an alternate link.

3. The system of claim 1, wherein the network operations center is configured to: monitor the communication links between the workplace and the first and second private networks to identify a security vulnerability; and reconfigure the system to eliminate the identified security vulnerability.

4. The system of claim 1, wherein:
the first organization comprises a corporation; and
the second organization comprises a government agency.

5. The system of claim 1, wherein:
the first private network, the second private network, the workplace and the third private network are each located, at least in part, in a single metropolitan area.

6. A system for securely providing network access to a multi-organization workplace, the system comprising:
a network operations center comprising an outside router and an inside router in communication with each other, the network operations center configured to:
- manage communication links between the workplace and a first private network of a first organization, and communication links between the workplace and the second private network of a second organization;
- monitor bandwidth and performance specifications for the first organization and the second organization;
- receive, via the outside router, a first data stream from the first private network and a second data stream from the second private network;
- route, via the inside router, the first data stream to only a first distinct area of the workplace occupied by and for exclusive use of a subset of employees of the first organization; and
- route, via the inside router, the second data stream to only a second distinct area occupied by and for exclusive use of a subset of employees of the second organization; and a plurality of geographically separated network devices, each connected with the network operations center with secure and redundant communication links, the plurality including:
- a first network device comprising a gateway to a private network of a first organization;
- a second network device comprising a gateway to a private network of a second organization; and
- a third network device comprising a gateway at a workplace shared by the first organization and the second organization, the third network device communicatively coupled with the first network device and the second network device through the network operations center, wherein the workplace is physically distinct from the first private network and the second private network, and the workplace comprises:
the first distinct area;
the second distinct area;
a third distinct area comprising a common area; and
a fourth distinct area comprising a server room including at least a portion of a network operations center.

7. The system of claim 6, wherein the network operations center is configured to:
monitor the communication links between the first, second, and third network devices to identify a link that fails to meet specified security and performance thresholds; and
reroute data traffic to avoid the identified link.

8. The system of claim 7, wherein the specified security and performance thresholds comprise a selection from the group consisting of: physical security metrics, intrusion detection metrics, quality of service metrics, access control system metrics, and any combination thereof.

9. The system of claim 6, wherein the workplace comprises:
a first distinct area for exclusive use of a subset of employees of the first organization; and
a second distinct area for exclusive use of a subset of employees of the second organization.

10. The system of claim 6, further comprising:
a fourth network device comprising a gateway to a private network of a first corporation; and
a fifth network device comprising a gateway to a private network of a federal agency,
wherein the workplace is further shared by the first corporation and the federal agency, and the third network device is further communicatively coupled with the fourth node and the fifth node through the network operations center; and
wherein the first organization comprises a state agency and the second organization comprises a second corporation.

* * * * *